Aug. 14, 1923.
G. W. HEISE ET AL
1,464,573
FLASH LIGHT AND BATTERY THEREFOR
Filed July 15, 1922
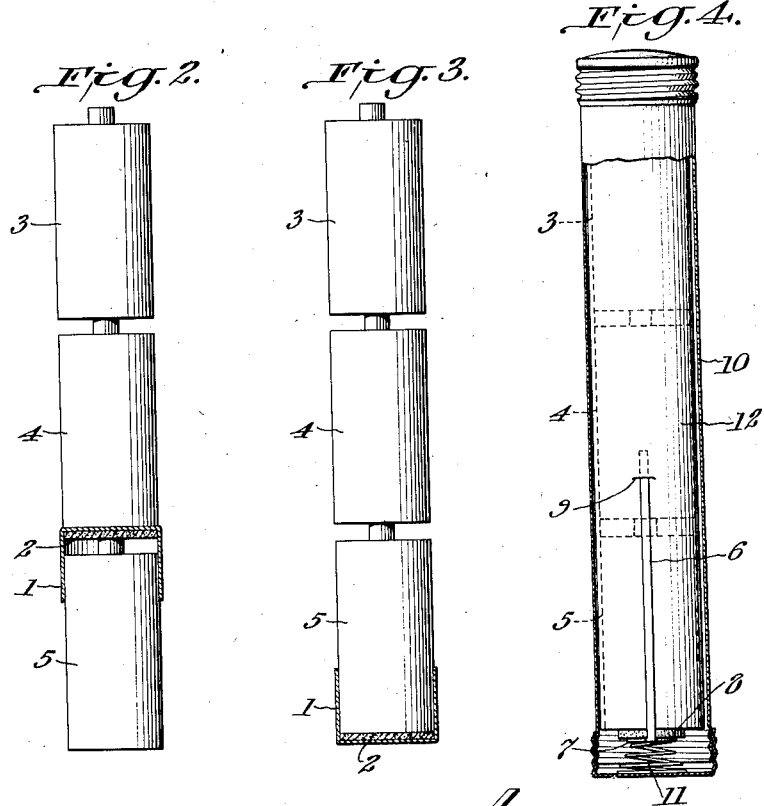
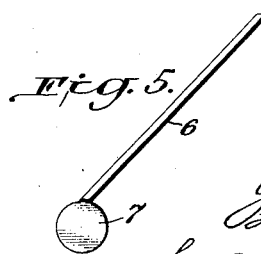
Inventors:
George W. Heise,
Harry L. Thompson,
by Bynner Townsend & Brickenstein,
Attorneys.

Patented Aug. 14, 1923.

1,464,573

UNITED STATES PATENT OFFICE.

GEORGE W. HEISE, OF ELMHURST, AND HARRY H. THOMPSON, OF FLUSHING, NEW YORK, ASSIGNORS TO UNION CARBIDE & CARBON RESEARCH LABORATORIES, INC., A CORPORATION OF NEW YORK.

FLASH LIGHT AND BATTERY THEREFOR.

Application filed July 15, 1922. Serial No. 575,182.

*To all whom it may concern:*

Be it known that we, GEORGE W. HEISE and HARRY H. THOMPSON, citizens of the United States, residing at Elmhurst and Flushing, respectively, in the county of Queens and State of New York, have invented certain new and useful Improvements in Flash Lights and Batteries Therefor, of which the following is a specification.

This invention relates to portable electric lighting devices energized by a battery, and has particular reference to the arrangement and utilization of the cells composing the battery. The principal object of the invention is to provide simple and effective means for permitting variation in the number of cells in circuit with the lamp.

In its preferred form the invention is embodied in lighting devices of the tubular flashlight type. The original voltage of batteries now used in tubular flashlights falls off rapidly when the batteries are put into use, with the result that lamps rated to operate efficiently at the average voltage may be burned out by the excessive initial current. This disadvantage is avoided by providing means for retaining one or more cells out of circuit until the total voltage of the cells in circuit has fallen to a point where the lamp is no longer satisfactorily operated. Also, the electrical energy of the cells may be more effectively utilized by proceeding in this manner. With the ordinary cell arrangement, when the voltage of the battery as a whole becomes too low to operate the lamp properly, no further utilization of the cells is possible. When additional cells are insertible in circuit to build up the voltage, cells which would otherwise be too far exhausted for further use may be retained and will give a further amount of electrical energy, resulting in a material lengthening of the service life of the battery as a whole. Further, it may be desirable in some cases to cut the auxiliary cell out of circuit when a dim light only is required, or that cell may be maintained as a safeguard against unexpected exhaustion of the battery.

These and other advantages are attained by the present invention, illustrated in a preferred form in the accompanying drawing, in which—

Fig. 1 is a perspective view of a member carrying an insulating disc adapted to retain a cell out of circuit;

Fig. 2 is an elevation of a three-cell battery with two cells operative, showing the member in vertical section;

Fig. 3 is a view similar to Fig. 2, with all three cells in circuit;

Fig. 4 is a partial vertical section through a flashlight having a three-cell battery, showing another means for variably connecting the cells; and Fig. 5 is a perspective view of the connecting member used in the device of Fig. 4.

Referring to Figs. 1, 2 and 3, numeral 1 denotes a conductive cup. A disc 2 of insulating material is seated in the bottom of the cup. Cells of any suitable kind, represented by way of example as dry cells of the zinc-carbon type, are indicated by numerals 3, 4 and 5.

When the battery is first put into service, cup 1 is placed between cells 4 and 5, as shown in Fig. 2. Cell 5 is thus cut out of circuit, as its carbon pole is kept out of contact with the zinc base of cell 4 by insulating disc 2. The conductive cup and the metal container of cell 5, however, may serve as part of the electric circuit, so that the base or bottom cell 5 may be used as one pole of the battery, in the usual manner. When it is desired to use all three cells, cup 1 is removed and may be placed at the base of cell 5, as shown in Fig. 3, or may be discarded.

In the form of the invention shown in Figs. 4 and 5, a conductive strip 6 having an extension 7 at right angles thereto, is used for variably connecting the cells. An insulating disc 8 spaces the extension 7 from the base of cell 5, when that cell is in out-of-circuit position, as shown in Fig. 4. The insulating wrapper of cell 4 is slit at 9 and strip 6 is inserted in the slit to make contact with the metal cup of the cell. The battery may accordingly be placed in the flashlight casing 10 to make contact with a spring 11 in the end cap, or other conductive means, as usual, the strip 6 and extension 7 serving to carry the current around cell 5, the zinc cup of which is insulated by its jacket and disc 8. When it is desired to use all three cells, strip 6 and disc 8 are removed, and circuit is made through the base of cell 5.

The conductive strip connector described makes it unnecessary at any time to remove the cells from their carton 12, and errors in inserting the cells are therefore prevented.

We are aware that flashlight casings have heretofore been constructed with special means for permitting the variable connection of cells in lateral alinement. Our invention is distinguished from such devices by the provision of simple and effective means, independent of the flashlight casing, for changing the number of operative cells in a battery of cells, which will usually, but not necessarily, be in vertical alinement. Among its particular advantages are simplicity and capability of use without necessitating any modification in the usual construction of flashlight casings.

The number of cells may differ from that shown and any other suitable type of cell having properly disposed electrodes may be used instead of dry cells. The described arrangements for insulating one of the electrodes of a cell while permitting the current to pass around said cell are illustrative only, and various alternative constructions for obtaining the same result fall within the scope of the appended claims.

We claim:—

1. In an electric lighting device energized by a battery, means carried by said battery and adapted to permit the utilization of a portion only of the battery cells, said means being removable to allow all the cells to cooperate in the production of current.

2. A battery comprising vertically alined cells, means for retaining one portion of the battery out of circuit with a second portion, said means being removable to permit both portions to cooperate in current production.

3. A battery comprising vertically alined cells in series connection and an auxiliary cell, means insulating an electrode of the auxiliary cell, said means being removable to permit electrical connection between said electrode and an electrode of opposite polarity in one of the series-connected cells, whereby the auxiliary cell may be used to augment the voltage of the battery.

4. In a tubular flashlight, a battery of vertically alined cells, a metallic member in electrical connection with an intermediate cell only, said member extending to a point adjacent the base of the battery and adapted to make connection with a conductor in the flashlight, means for insulating said metallic member so that current therethrough may by-pass cells below said intermediate cell, said insulating means and metallic member being removable to permit all the cells to cooperate in the production of current.

In testimony whereof, we affix our signatures.

GEORGE W. HEISE.
HARRY H. THOMPSON.